United States Patent [19]

Holz et al.

[11] Patent Number: 4,632,320
[45] Date of Patent: Dec. 30, 1986

[54] APPARATUS FOR DISSOLVING AND SORTING WASTE PAPER

[75] Inventors: Emil Holz, Eningen; Hagen Hutzler, Reutlingen, both of Fed. Rep. of Germany

[73] Assignee: Hermann Finckh Maschinenfabrik GmbH, Pfullingen, Fed. Rep. of Germany

[21] Appl. No.: 741,676

[22] Filed: Jun. 5, 1985

[30] Foreign Application Priority Data

Jun. 9, 1984 [EP] European Pat. Off. .......... 84106628.5

[51] Int. Cl.$^4$ ............................................. B02C 17/02
[52] U.S. Cl. .................................. 241/46.17; 241/74; 241/152 R; 241/101 B
[58] Field of Search ............... 241/46.11, 24, 46.17, 241/28, DIG. 10, 74, 152 R, 101 B; 162/4, 155

[56] References Cited

U.S. PATENT DOCUMENTS 3,871,438  3/1975  Vissers et al. .......... 241/DIG. 10 X
4,283,275  8/1981  Heinbockel et al. ............. 241/24 X
4,465,591  8/1984  Holz et al. .

FOREIGN PATENT DOCUMENTS 2651198  2/1981  Fed. Rep. of Germany .
3221788  11/1983  Fed. Rep. of Germany .

Primary Examiner—Mark Rosenbaum
Attorney, Agent, or Firm—Leydig, Voit & Mayer

[57] ABSTRACT

Apparatus for dissolving and sorting waste paper supplied in the form of bales, comprising a bale shredding device having a spray pipe for steeping water, a subsequent steeping drum driven about an approximately horizontal axis and followed by a mixing device for mixing the steeped waste paper with diluting water as well as a sorting drum also rotatable about an approximately horizontal axis. The circumferential wall of this sorting drum has openings in a first sorting area which are smaller than the openings in a second sorting area which follows the first sorting area in the direction of flow. A deflaking device is provided for the suspension passing through the openings of the second sorting area, the outlet of this device being connected to the mixing device via a pump.

10 Claims, 6 Drawing Figures

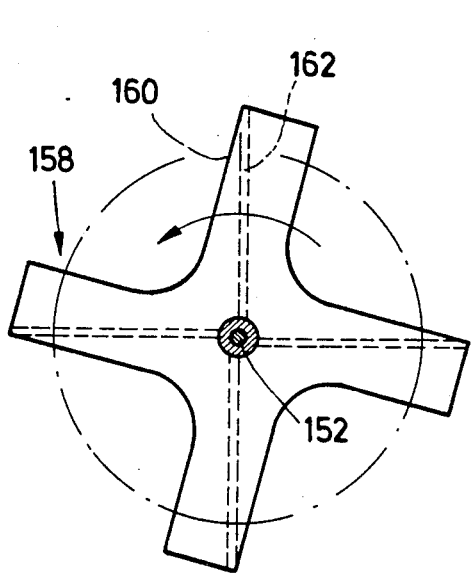
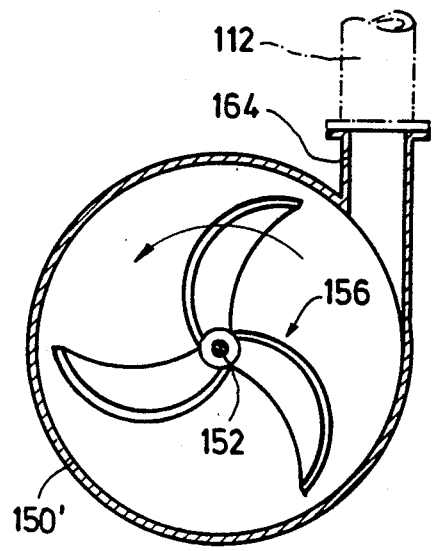
Fig. 4          Fig. 5
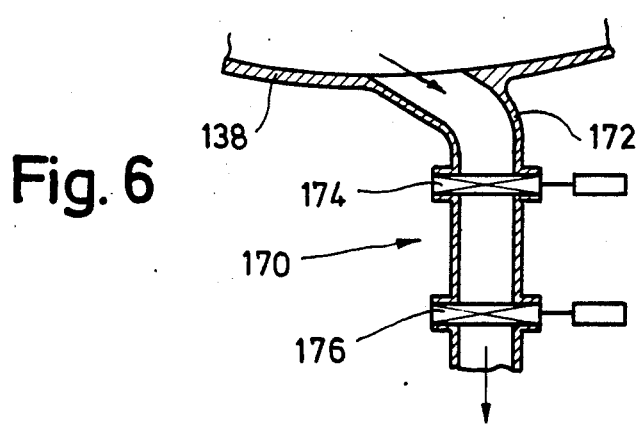
Fig. 6

APPARATUS FOR DISSOLVING AND SORTING WASTE PAPER

When dissolving waste paper, i.e. converting the waste paper into a fiber suspension, by means of a pulper (dissolving in batches) and also when using a rotating drum having a feed opening at the front and an outlet opening at the back as well as an approximately horizontal drum axis (continuous method) the aim is to treat the waste paper until a high degree of dissolution is reached. When treating a mixture of waste paper, the material fed to the dissolving device is of an extremely varying character and requires correspondingly varying treatment times in order to dissolve. If the dissolving time is long enough to allow even material which is hard to dissolve to disintegrate into its individual fibers, the energy required for this will be uneconomically high. If, however, the dissolving time is shortened such that only those components of the mixed waste paper which are easy to dissolve will largely disintegrate into their individual fibers, a considerable loss in fibers will result since the other components of the mixed waste paper are to a large extent undissolved.

The object underlying the invention was therefore to develop an apparatus for dissolving and sorting waste paper, in particular an assorted waste paper, which requires less energy to operate than the known apparatus for dissolving and sorting waste paper but which nevertheless avoids the loss of a relatively large proportion of reusable fibrous material which is otherwise thrown away with the non-dissolvable waste paper components, such as wire, plastic foils and the like, as so-called rejected material.

To accomplish the aforesaid object, the invention proceeds on the basis of a known apparatus for dissolving and sorting waste paper which comprises a water supply means and a drum, which is open to the front and back, rotatable about an approximately horizontal axis and has a partially perforated circumferential wall, for mixing the waste paper with water, steeping said waste paper and sorting out fibrous material. An apparatus of this type is known, for example, from German published application No. 26 51 198. In accordance with the invention it is now proposed that an apparatus of this type be designed such that a first drum having an at least substantially closed circumferential wall for mixing water and waste paper as well as for steeping and partially dissolving this waste paper and a second drum also for partially dissolving the waste paper as well as for sorting out fibrous material are provided one behind the other in the direction of flow of the waste paper, that the sorting drum has first and second sorting areas arranged one behind the other in the direction of flow and each having a perforated circumferential wall, the openings in the circumferential wall of the first sorting area being smaller than those in the second sorting area and that, finally, a suspension return means containing a deflaking or defiberizing device is provided between a collecting means for the suspension passing through the openings in the second sorting area and an area of the two drums located in front of the first sorting area.

A main advantage of the inventive apparatus is the fact that the fibers of the easily dissolvable components of the waste paper may be drawn off in the first sorting area of the sorting drum and used as accepted material. At the same time, the fibrous material components of the mixed waste paper, which are more difficult to dissolve completely, may be drawn off through the larger openings of the second sorting area and thereby separated from the coarse components, such as plastic parts and foils, wood, metal and glass parts etc., which form the rejected material. These fibrous material components are then completely dissolved, at least to a large extent, and fed back to the area in front of the first sorting area. The deflaking device may be any type of known device for dissolving, defiberizing or deflaking. An additional advantage of the inventive apparatus is to be seen in the fact that the steeping drum may be driven at a different rotational speed to the sorting drum and also that the axes of the two drums may be inclined at different angles relative to the horizontal. The rotational speed and axis inclination allow regulation of the intensity of the steeping, dissolving and sorting process and the time material requires to pass through the relevant drum. In the inventive apparatus, the steeping drum is regulated separately. In this drum the waste paper is intended to be mixed with water, steeped and dissolved to a considerable extent whereas the sorting drum substantially serves to separate out the completely or partially dissolved components of the fibrous material.

The known dissolving and sorting apparatus according to DE-AS 26 51 198 does not have this flexibility since this apparatus has one single drum for dissolving and sorting. In this respect, a first drum area having a closed circumferential wall is used for steeping and dissolving and a subsequent, second drum area having a perforated circumferential wall for sorting.

The inventive solution could also not be anticipated by another known dissolving and sorting apparatus (German laid-open paper DE-OS 29 41 89). This apparatus does carry out the steeping process in a horizontal drum but the dissolving process is substantially carried out in a mixer. This mixer comprises an upwardly open, container-type housing and a mixing wheel disposed therein. The mixer is followed by a sorting device in the form of a so-called unbalance vibrator or Jonsson screen.

In a preferred embodiment of the invention, a mixing device for mixing water with the waste paper leaving the steeping drum is provided between the steeping drum and the sorting drum since the substance density during steeping and preferably during dissolving as well, which substantially takes place in the steeping drum, is higher than during sorting when the fibers are intended to pass, with water, through the sorting openings. It is then particularly advantageous when the fiber suspension thus formed can already be transported further by means of a pump. The preferable substance density in the steeping drum, i.e. approximately 12 to 25%, may be reduced in the mixing device to a maximum substance density of approximately 6% by adding diluting water. In this respect, it has proven particularly appropriate to provide the sorting drum with a mixing area which has a closed circumferential wall and is located in front of the first sorting area. This means that the waste paper will be vigorously remixed in the sorting drum prior to sorting and the fibrous material dissolved as far as possible.

Since the stream of material to be returned from the second sorting area has a lower substance density than the material leaving the steeping drum, it is further recommended that the return means connects the collecting means, which is associated with the second sorting area, with the mixing means between the steeping drum and the sorting drum. As already mentioned, any of the known deflaking devices may be used in the inventive apparatus for the stream of material passing through the openings in the second sorting area. In a preferred embodiment of the inventive apparatus, the deflaking device is, however, designed such that it has a pump rotor and a dissolving rotor both mounted on a driven shaft, that the pump rotor is surrounded by a housing having an inlet for the suspension and an outlet for the suspension to be pumped back in front of the first sorting area and that the dissolving rotor located in front of the pump rotor in the direction of flow is provided with ripping or cutting edges. A deflaking or defiberizing device of this type could be connected by a pipe to the collecting means located beneath the second sorting area. An embodiment is, however, preferred, in which the collecting means is designed as a collecting tank arranged beneath the second sorting area of the sorting drum and the housing of the deflaking device opens into this collecting tank.

The simplest method is, of course, to feed waste paper directly to a reprocessing plant in the customary form, i.e. as bales of waste paper which have, as is well-known, the approximate shape of a rectangular parallelepiped, consist of compressed waste paper and are held together by wires or metal tapes. Until now, it has been customary to comminute the bales of waste paper in so-called bale shredders which have a plurality of individually driven worm gears disposed in a housing for breaking up the bales. These known bale shredders are, however, complicated to produce and regulate and therefore costly since the worm gears tend to become jammed in the housing, due to the wires, metal tapes and the like, whereupon the direction of rotation of the worm gears must be automatically reversed by the control system. In the known reprocessing plants, the components of the shredded bales of waste paper are transported further on a conveyor belt. The customary bale shredders are not only complicated and susceptible to breakdown but they also cause a large amount of dust to develop and this could be a considerable fire hazard.

In a preferred embodiment of the inventive apparatus, a shredding device for bales of waste paper is disposed directly in front of the steeping drum and this shredding device has a housing with an upper feed opening and a lower outlet opening as well as a shredding disc on a shaft penetrating the housing wall, this disc being provided with ripping or cutting edges. In contrast to the worm gears of the known bale shredders, this disc cannot become jammed.

In order to avoid wires, string and the like becoming wrapped around the shaft bearing the shredding disc, this disc has a work side facing the interior of the housing and a reverse side closely adjoining the housing wall. A so-called labyrinth seal is appropriately provided between the circumferential edge region of the reverse side and the adjacent housing wall. To prevent dust developing and thereby rule out any risk of fire, the shredding device has a water-spraying means which has the additional advantage that a certain pre-steeping of the waste paper takes place in the shredding device.

Instead of returning the entire stream of material issuing from the deflaking device to the area in front of the first sorting area of the sorting drum, the return means may include a Jonsson screen, the sieve of which preferably has smaller openings than the second sorting area and prevents all the dirt returning to the sorting drum, especially when the waste paper is extremely soiled. Only that part of the material stream which passes through the openings in the Jonsson screen is then returned to the sorting drum.

Additional features, details and advantages of the invention are given in the following description and the attached drawings of a preferred embodiment of the inventive apparatus for dissolving and sorting waste paper. In the drawings, FIG. 1 is a schematic illustration of the entire apparatus;

FIG. 4 is a section along line 4—4 in FIG. 3 to illustrate the dissolving rotor of the deflaking device;

FIG. 5 is a section along line 5—5 to illustrate the pump rotor of the deflaking device, and FIG. 6 is a section along line 6—6 in FIG. 3.

Figure 1:
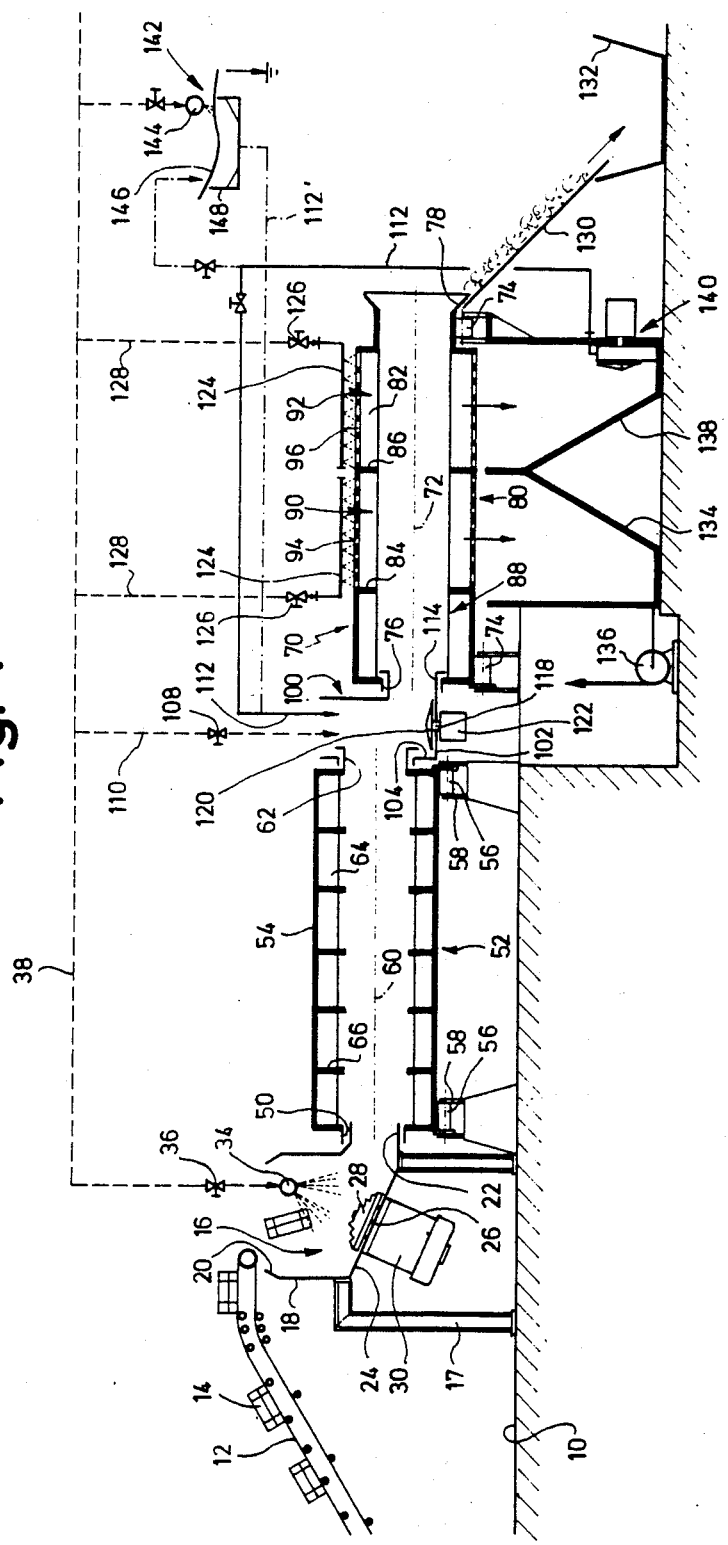

The apparatus shown in FIG. 1, which is assembled on the floor 10 of a building, has a conveyor belt 12 for feeding bales of waste paper 14 to a bale shredding device 16. This device has an approximately funnel-shaped housing 18 mounted on a frame 17 and comprising an upper feed opening 20, a lower outlet opening 22 and an inclined housing wall area 24. A drive shaft 26 for a shredding disc 28 penetrates this wall which mounts a motor 30 for driving the shaft 26. The housing 18 also includes a spray pipe 34 which is merely indicated schematically and is connected to a water supply line 38 via a valve 36.

Figure 2:
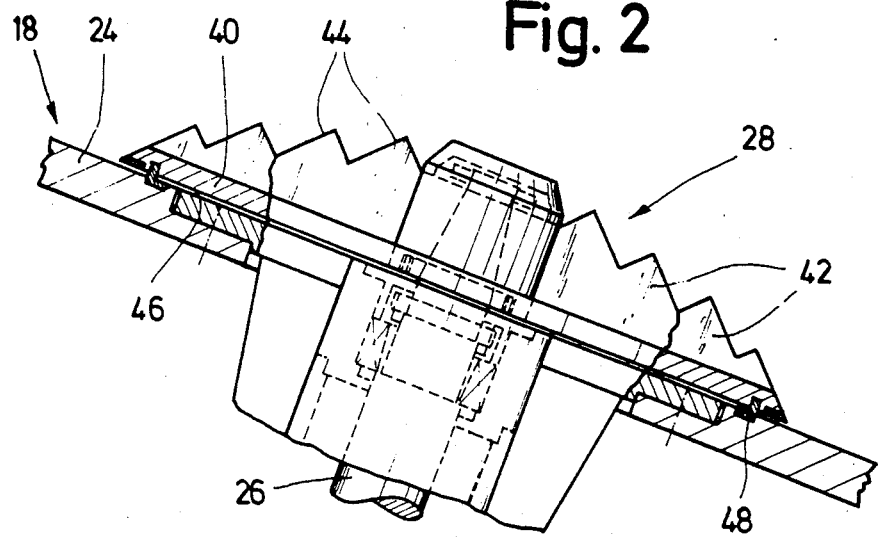
FIG. 2 is a section along a diametral plane through the shredding disc of the shredding device arranged in front of the steeping drum.

As shown in FIG. 2, the shredding disc 28 has a supporting disc 40 mounted on the drive shaft 26. Secured to the supporting disc are serrated ledges 42 which face the interior of the housing 18 and have ripping or cutting edges 44. The reverse side 46 of the disc forms a labyrinth seal 48 with the inclined housing wall area 24 so that no wires, strings, plastic foils and the like may become entangled around the drive shaft 26 and no solid components in the waste paper may penetrate the gap between the supporting disc 40 and the housing wall area 24 and thus jam the shredding disc 28.

The outlet opening 22 of the shredding device 16 forms a type of tubular connection which protrudes into an inlet opening 50 of a steeping drum 52. The latter has a closed wall 54 which rests on pairs of rollers 56 at the end regions of the drum. These pairs of rollers are rotatably mounted in frames 58 and driven by a motor, which is not illustrated, such that they rotate the steeping drum 52 about its longitudinal axis 60. The drum axis 60 is slightly inclined relative to the horizontal. In accordance with FIG. 1, the axis is downwardly inclined to the right, the degree of inclination hereby being an important parameter for the length of time the waste paper remains in the steeping drum 52. Ledges 64 for entraining the waste paper are arranged in the interior of the drum and extend between the inlet opening 50 and an outlet opening 62. These ledges may be shaped, for example, like ribs extending in the axial and radial directions. They may also be inclined relative to the longitudinal direction of the drum such that they have the effect of conveying waste paper from left to right, as seen in FIG. 1, in accordance with the direction of rotation of the steeping drum 52. It is also appropriate to have the ledges 64 interrupted by intermediate radial rings 66 which prevent the waste paper from passing too quickly through the steeping drum 52 and, if necessary, may protrude radially and inwardly beyond the ledges 64.

The steeping drum 52 is followed by a sorting drum 70 which differs from the steeping drum 52 only in that its wall is partially perforated. A cursory description of the corresponding features therefore suffices. The sorting drum 70 has an axis 72 which is slightly inclined to the right in FIG. 1, pairs of rollers 74 which support and drive the drum, an inlet opening 76 and an outlet opening 78, a wall designated as a whole as 80, ledges 82 for entraining the waste paper and two intermediate rings 84 and 86 which divide the sorting drum 70 into a mixing area 88, a first sorting area 90 and a second sorting area 92. In the mixing area 88, the drum wall 80 is closed whereas the drum wall in the two sorting areas is perforated. Openings 94 in the first sorting area 90 have a smaller through-section than the openings 96 in the second sorting area 92.

A mixing device 100 with a housing 102 is located between the steeping drum 52 and the sorting drum 70. The housing 102 has an inlet opening 104. A pipe connection which forms the outlet opening 62 of the steeping drum 52 projects into this inlet opening. Various conduits lead from above into the housing 102, namely a diluting water conduit 110, which is provided with a valve 108 and branches off the supply line 38, and a return line 112. Finally, the housing 102 of the mixing device 110 has an outlet pipe 114 which projects into the inlet opening 76 of the sortingdrum 70 and is lower than the outlet opening 62 of the steeping drum 52. A drive shaft 118 projects through the floor of the housing 102. This drive shaft mounts a mixing wheel 120 in the interior of the housing and is driven by a motor 122.

Spray pipes 124 are arranged above the sorting areas 90 and 92 of the sorting drum 70. These pipes are connected to the supply line 38 via valves 126 and diluting water pipes 128.

The outlet opening 78 of the sorting drum is located above a chute 130 leading to a waste tank 132.

A tank 134 for accepted material is arranged below the first sorting area 90 of the sorting drum and usable fiber suspension is withdrawn from this tank by a pump 136. A collecting tank 138 is arranged below the second sorting area 92 and a deflaking device 140, which will later be described in more detail, is integrated into this tank. The return line 112 leads from the deflaking device to the mixing device 100. A known Jonsson screen 142 may be provided for the entire stream of material issuing from the deflaking device 140 or a part thereof. Located above the Jonsson screen is a spray pipe 144 connected to the supply line 38 and the sieve 146 of the Jonsson screen has smaller openings than the second sorting area 92. A collecting tank 148 for the fiber suspension passing through the sieve 146 is connected with the mixing device 100 via a return line 112'.

Figure 3:
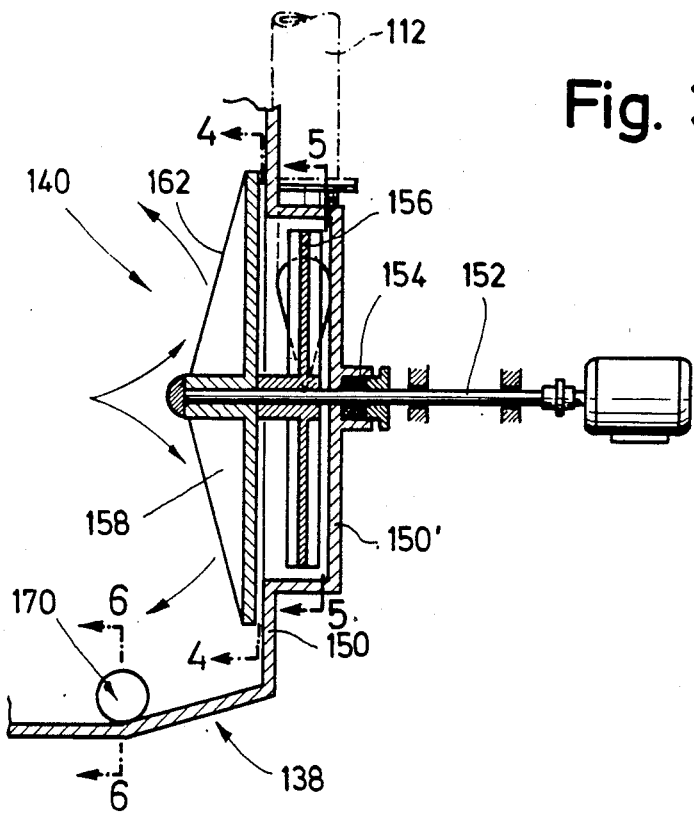
FIG. 3 is a section along a vertical diametral plane of the deflaking device.

FIGS. 3 to 6 serve to explain the deflaking device 140. In FIG. 3, the wall of the collecting tank 138 has been designated 150. This wall forms a pump housing 150' with a circular-cylindrical, relatively short protrusion. The front wall of the housing is penetrated by a drive shaft 152 sealed by a gland 154. The design of a pump rotor 156 mounted on the drive shaft 152 is illustrated in FIG. 5 while FIG. 4 shows a dissolving rotor 158 which is also mounted on the shaft 152, is seated in front of the pump rotor 156 when viewed from the interior of the collecting tank 138 and has ripping or cutting edges 160, 162. As shown by FIGS. 3 and 5, a tangentially aligned outlet pipe 164 is attached to the pump housing 150 and connected to the return line 112. The stream of material flowing into the collecting tank 138 is defiberized or deflaked by the rotor 158, whereupon the stream of material is pressed into the return line 112 by the pump rotor 156.

Finally, FIGS. 3 and 6 illustrate a so-called heavy component sluiceway 170. This essentially comprises an outlet pipe 172 and two pneumatic slides 174 and 176 arranged one behind the other in spaced relation. Specifically heavy waste components, such as metal particles, are discharged from time to time from the floor area of the collecting tank 138 through this sluiceway.

The following is a summary of the mode of operation of the apparatus shown.

The bales of waste paper 14 are shredded in the shredding device 16, which has a housing 18 made from sheet steel, by means of the rapidly rotating shredding disc 28. When a bale of waste paper falls onto the disc 28 it is thrown with considerable force against the wall of the housing 18 and thus broken open. The wires, string or metal tapes holding the bales together are ripped apart and the bale split up. The spray pipe 34 then sprays water onto the waste paper in a controlled manner and in such a quantity that the substance density in the steeping drum 52 is regulated to approximately 12 to 25%. Chemicals may be added to the water to accelerate dissolution. In the steeping drum 52, the waste paper is mixed with water, steeped, repeatedly lifted by the ledges 64, whereupon it falls back to the floor of the drum, and at least partially dissolved. In the mixing device 100, the substance density is reduced to a maximum value of 6% due to water supplied from the supply line 38 and to the fiber suspension which is fed back through the return line 112 and already has a relatively low substance density.

Fibrous material and diluting water are mixed together not only by the mixing wheel 120 but also in the mixing area 88 of the sorting drum 70. With the aid of the spray pipes 124, the fully dissolved components of the fibrous material are now separated out in the first sorting area 90 and pass into the tank 134 for accepted material. Fibrous material which is not fully dissolved leaves the sorting drum in the second sorting area 92 and passes into the collecting tank 138. Finally, coarse components leave the sorting drum via the outlet opening 78 and pass into the waste tank 132. The incompletely dissolved fibrous material and so-called flakes in the collecting tank 138 are completely dissolved by means of the deflaking device 140. The pump rotor 156 of the deflaking device 140 pumps the fiber suspension thus formed to the Jonsson screen 142 and back to the mixing device 100 so that the usable fibers are then separated out in the first sorting area 90 of the sorting drum 70.

What is claimed is:

1. Apparatus for recovering fibers from a stream of waste paper flowing therethrough, comprising:
   a first drum, mounted for rotation about a substantially horizontal axis, for steeping and partially disintegrating said waste paper, said first drum having an inlet opening for said waste paper at a first end, an outlet opening at a second end and an at least substantially closed circumferential wall;
   drive means for rotating the first drum;
   a second drum, mounted for rotation about a substantially horizontal axis and located downstream of said first drum, for further disintegrating said waste paper and for sorting out fibrous material comprising said fibers, said second drum having an inlet opening at a first end, an outlet opening at a second end, and first and second sorting zones arranged one behind the other relative to the first and second ends of said second drum, each of said sorting zones having a perforated circumferential wall providing screen openings, said openings of said first sorting zone being smaller than those of said second sorting zone;

drive means for rotating the second drum;

means for introducing said waste paper and water into the first drum through its inlet opening;

mixing means for mixing steeped and partially disintegrated waste paper leaving the outlet opening of said first drum;

means for connecting said mixing means with the first sorting zone of the second drum;

means for collecting a fibrous suspension passing through the screen openings of the second sorting zone; and suspension return means comprising a defiberizing device connecting said collecting means to said mixing means located upstream of said first sorting zone and downstream of said first drum.

2. Apparatus as claimed in claim 1, wherein said second drum further comprises a mixing zone with a closed circumferential wall upstream of said first sorting zone.

3. Apparatus as claimed in claim 1, wherein said defiberizing device comprises a defiberizing rotor and a pump rotor both mounted on a motor driven rotatable shaft, said defiberizing rotor being located in front of said pump rotor in the direction of flow and being provided with ripping or cutting edges, and said pump rotor being surrounded by a housing having an inlet for the fibrous suspension and an outlet for the suspension to be returned to said mixing means.

4. Apparatus as claimed in claim 3, wherein said collecting means comprises a collecting tank disposed beneath said second sorting zone of said second drum and the housing of said defiberizing device opens into said collecting tank.

5. Apparatus as claimed in claim 1, wherein a device for shredding bales of waste paper is disposed directly upstream of the inlet opening of said first drum, said shredding device comprising a housing with an upper inlet opening and a lower outlet opening, a shredding disc mounted on a rotatable shaft penetrating through the housing wall, said disc being provided with ripping or cutting edges, and driving means for driving said shaft.

6. Apparatus as claimed in claim 5, wherein said shredding disc has a work side facing the interior of the housing and a reverse side closely adjoining the housing wall.

7. Apparatus as claimed in claim 5, wherein between its inlet opening and its outlet opening, said shredding device has an inclined housing wall area facing said two openings, the shredding disc closely adjoining said inclined housing wall area.

8. Apparatus as claimed in claim 6, wherein a labyrinth seal is provided between the housing wall and a circumferential edge region of the reverse side of said shredding disc.

9. Apparatus as claimed in claim 5, wherein said shredding device has water spraying means.

10. Apparatus as claimed in claim 1, wherein said suspension return means includes a Jonsson screen with a sieve having smaller openings than said screen openings of said second sorting zone of said second drum.

* * * * *